(12) United States Patent
DiPietro et al.

(10) Patent No.: US 9,376,521 B2
(45) Date of Patent: Jun. 28, 2016

(54) POLYMER COMPOSITION WITH SALIVA LABILE AVERSIVE AGENT

(71) Applicant: GLOBALFOUNDRIES INC., Grand Cayman (KY)

(72) Inventors: Richard A. DiPietro, Campbell, CA (US); Thomas J. Fleischman, Poughkeepsie, NY (US); Richard Hutzler, Tucson, AZ (US); Keith B. Maddern, Tucson, AZ (US); William K. Morse, Tucson, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 409 days.

(21) Appl. No.: 13/917,288

(22) Filed: Jun. 13, 2013

(65) Prior Publication Data

US 2014/0371411 A1   Dec. 18, 2014

(51) Int. Cl.
*C08F 220/36* (2006.01)
*C08F 8/00* (2006.01)

(52) U.S. Cl.
CPC *C08F 220/36* (2013.01); *C08F 8/00* (2013.01)

(58) Field of Classification Search
CPC ...... A61K 31/74; A61K 31/75; A61K 31/785
USPC ......... 526/268, 304; 424/78.17, 78.18, 78.27, 424/411, 412
See application file for complete search history.

(56) References Cited

U.S. PATENT DOCUMENTS

| | | | |
|---|---|---|---|
| 4,544,693 A | 10/1985 | Surgant |
| 4,692,494 A | 9/1987 | Sonenstein |
| 4,765,916 A | 8/1988 | Ogar, Jr. et al. |
| 5,272,191 A | 12/1993 | Ibrahim et al. |
| 5,816,421 A | 10/1998 | Clodfelter et al. |
| 5,997,894 A | 12/1999 | Blum et al. |
| 6,164,278 A | 12/2000 | Nissani |
| 6,448,219 B1 | 9/2002 | Cooper |
| 6,468,554 B1 | 10/2002 | Ichino |
| 6,652,632 B2 | 11/2003 | Moodycliffe et al. |
| 6,815,410 B2 | 11/2004 | Boutique et al. |
| 7,141,250 B2 | 11/2006 | Oshlack et al. |
| 7,704,519 B1 | 4/2010 | Baldwin |
| 7,815,934 B2 | 10/2010 | Boehm |
| 8,104,433 B2 | 1/2012 | Clement |
| 2004/0136912 A1 | 7/2004 | Murray et al. |
| 2004/0228802 A1 | 11/2004 | Chang et al. |
| 2005/0118273 A1 | 6/2005 | Sasaki et al. |
| 2009/0253286 A1 | 10/2009 | Tanaka et al. |
| 2012/0065221 A1 | 3/2012 | Babul |
| 2012/0121680 A1 | 5/2012 | Rosenburgh et al. |
| 2012/0128805 A1 | 5/2012 | Clement |

OTHER PUBLICATIONS

Alexandre Imbot, "Children are Sent to Hospitals Repeatedly After Ingesting New Detergent Packs", Newsaction Northamerica, Sep. 10, 2012.
Mike M. Ahlers, "Experts warn that detergent capsules are choking, poison threat to kids", CNN Health, Sep. 5, 2012.
Jenifer Goodwin, "Laundry Detergent Packs Pose Poisoning Threat to Toddlers", HealthDay, http://consumerlhealthday.com/Article.sap?AID=668356, Apr. 9, 2013.
Linda Stewart Ball & Normaan Merchant, "P & G to Add Latches to Make Detergent Packs Safer", Chem Info, May 29, 2012.
"Toddlers increasingly swallowing liquid detergent capsules", Archives of Disease in Childhood, Sep. 5, 2012, BMJ Publishing Group.

*Primary Examiner* — Edward Cain
(74) *Attorney, Agent, or Firm* — Yuanmin Cai; Hoffman Warnick LLC

(57) ABSTRACT

For a polymer composition, a polymerizable aversive agent is chemically coupled to a substrate element. The chemical coupling is labile to saliva.

20 Claims, 7 Drawing Sheets

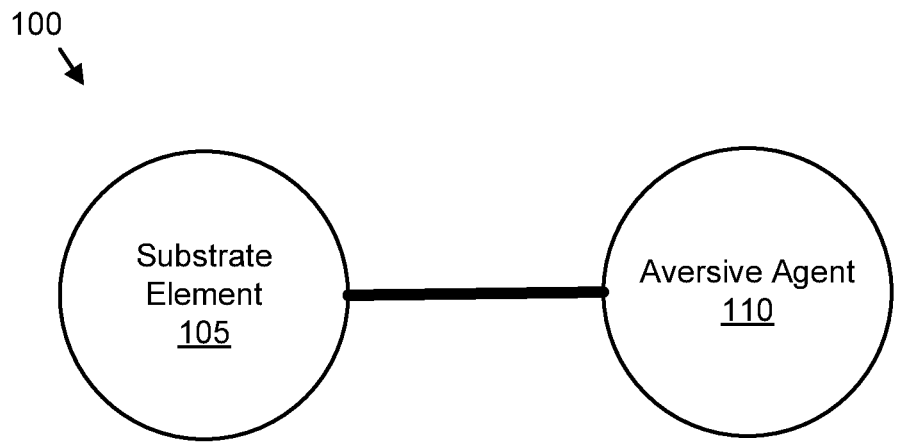
FIG. 1
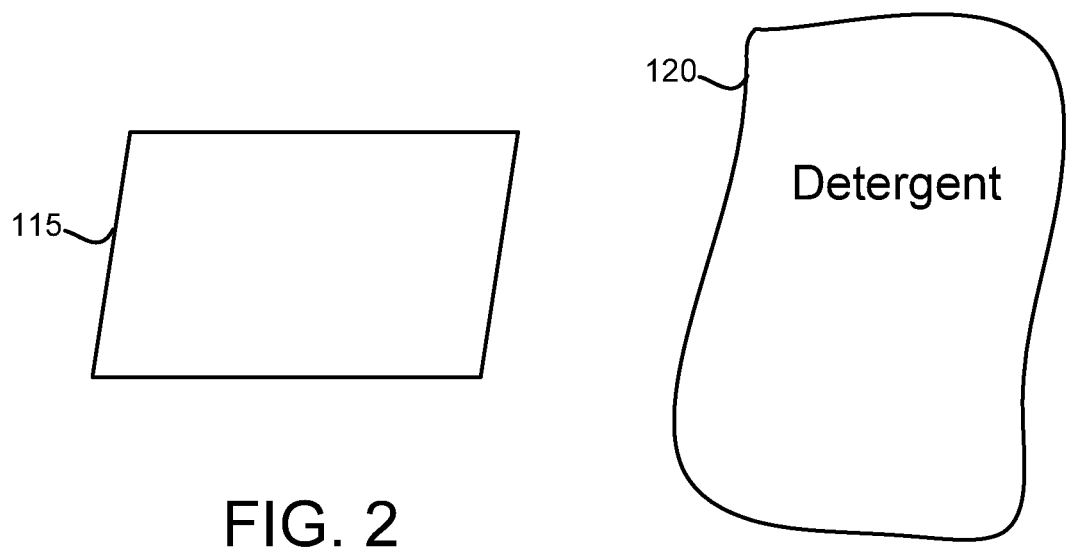
FIG. 2
FIG. 3

205

Denatonium

210

Denatonium
benzoate

Denatonium 4-vinylbenzoate

Polymerized Denatonium

245

Capsaicin

250

Capsaicin analog

Polymerized Capsaicin

POLYMER COMPOSITION WITH SALIVA LABILE AVERSIVE AGENT

FIELD

The subject matter disclosed herein relates to aversive agents and more particularly relates to saliva labile aversive agents.

BACKGROUND

Description of the Related Art

Every year, thousands of children attempt to eat detergent gel packs, thinking the colorful packs contain candy. Should the child puncture the packaging and ingest the detergent serious injury could result. Even if the detergent is not ingested, children often accidently inhale the detergent through an inhalation response and the detergent, a surfactant; can have serious effects on a child's lungs. Even contact to skin and eyes can result in serious injury.

BRIEF SUMMARY

A polymer composition with a saliva labile aversive agent is disclosed. The polymer composition includes a substrate element and an aversive agent chemically coupled to the substrate element. The chemical coupling is labile to saliva. A method and film also perform the functions of the polymer composition.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic diagram illustrating one embodiment of a polymer composition;

FIG. 2 is a front view drawing illustrating one embodiment of a polymer film;

FIG. 3 is a front view drawing illustrating one embodiment of a detergent package;

DETAILED DESCRIPTION

Figure 4:
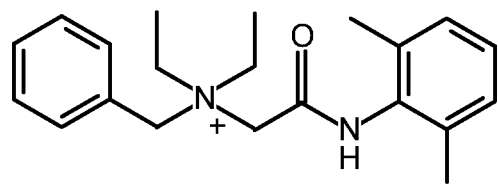
FIG. 4 is a schematic drawing illustrating one embodiment of Denatonium.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Modern packaging is designed to be attractive and enticing. Unfortunately, this attractive packaging often encloses dangerous substances such as detergents. For example, many detergents are packaged as single dose packets or gel packs.

Young children often mistake these packages for candy and/or treats. As a result, they may attempt to bite or otherwise open a package. Such attempts are extremely common. In August 2012, poison centers in the United States received 734 calls regarding children and single use detergent packages, with the single use detergent packages accounting for about half of detergent related poisonings. Single use detergent package poisonings are often more harmful because the detergent packaged therein is significant more concentrated than in more traditional packaging.

When a child is able to puncture a package containing a dangerous substance, the substance is often ingested. Unfortunately, even ingesting small amounts of a dangerous substance such as a detergent can have dire consequences. Detergents often include strong acids, alkalis, and/or phosphates which can erode soft tissue. Cationic and anionic detergents may cause severe change in the pH of the blood that can damage bodily organs. In addition, the ingestion of detergents may rapidly lower blood pressure and cause heart problems.

A child that punctures a package containing a dangerous substance may also convulsively squeeze and/or throw the package, spraying the substance about. As a result, the child may be injured even if none of the substance is ingested. Detergents that contact the eye can cause diminished vision and extreme pain. Detergents that contact mouth, tongue, throat, and nose tissues typically cause severe burning and pain. Detergents that contact the skin can cause burns, necrosis, and irritation.

A child may also reflexively inhale a dangerous substance from a package, drawing the substance into the throat and lungs. These substances can be especially dangerous in the lungs. Detergents are surfactants that lower the surface tension within the lungs and cause severe breathing disorders.

As a result, it is important that a child never punctures the packaging containing a dangerous substance. In the past, aversive agents such as bitterants and pungent agents have been incorporated in the matrix of a packaging as an additive to dissuade the child from attempting to chew open a package.

Unfortunately, mechanical action is required to release the aversive agent from the matrix in these packages. A child may puncture the package before sufficient aversive agent is released to dissuade the child from continuing to attempt to open the package. As a result, the dangerous substance may be released from the package and harm the child through ingestion, inhalation, and/or contact.

The embodiments described herein chemically couple an aversive agent to a substrate element rather than incorporate the aversive agent as additives in the package matrix. The chemical coupling is labile to saliva so that the aversive agent is rapidly released in sufficient time to stop the child from puncturing the package as will be described hereafter. By rapidly releasing the aversive agent, the embodiments stop a child from puncturing a package so that the child does not contact the dangerous substance therein in any way.

FIG. 1 is a schematic diagram illustrating one embodiment of a polymer composition 100. The polymer composition 100 includes a substrate element 105 and an aversive agent 110. The polymer composition 100 may be included in packaging such as for detergents and other dangerous substances. The chemical coupling of the aversive agent is labile to saliva so that when the packaging contacts the saliva of a child, the chemical coupling is broken and the aversive agent is immediately released to dissuade the child from continuing to chew on the package. In one embodiment, the aversive agent may be released within 500 milliseconds (ms) of contact with saliva.

The substrate element 105 may be a polymerizable moiety. The moiety may be reactive with the aversive agent 110. The polymerizable moiety may be selected from the group consisting of a vinyl group, a hydroxyl group, a carbonyl group, an aldehyde group, a haloformyl group, a carbonate ester group, a carboxylate group, a carboxyl group, an ester group, a methoxy group, a hydroperoxy group, a peroxy group, an ether group, a hemiacetal group, a hemiketal group, an acetal group, a ketal group, an orthoester group, and a orthocarbonate ester group.

Alternatively, the substrate element 105 may be a polymer binder. The polymer binder may be selected from the group consisting of polyvinyl alcohols, polyvinyl alcohol copolymers, hydroxypropyl methyl cellulose (HPMC), polyacrylic and polymethacrylic acids, vinylbenzoic acid, and copolymers thereof The aversive agent 110 may be selected from the group consisting of bitterants, emetics, odorants, and pungent agents. A bitterant may have a bitterness threshold in the range of 20 to 0.01 parts per million (ppm). A pungent agent may have a pungency in the range of 100,000 to 20,000,000 Scoville heat units.

The bitterant may be selected from a Denatonium salt and/or a bitter phenolic. The Denatonium salt may be Denatonium benzoate, Denatonium 4-vinylbenzoate, and/or Denatonium saccharide. In one embodiment, the bitter phenolic may be a Quercetin analog as will be described hereafter. The emetic may be one or more of ayahuasca and syrup of ipecac.

The pungent agent may be a capsaicin analog as will be described hereafter. In one embodiment, the pungent agent is one or more of a capsiate, a gingerol, a piperine, a shogaol, a nonivamide, and the like.

The odorant may be a composition selected from an ester composition, a linear terpenes composition, a cyclic terpenes composition, an aromatic composition, an amines composition, an alcohol composition, an aldehyde composition, a ketone composition, a lactone composition, and/or a thiol composition.

The aversive agent 110 may be chemically coupled to the substrate element 105. In one embodiment, the aversive agent 110 and substrate element 105 also be polymerized and hydrolyzed so that the aversive agent 110 will be readily labile in saliva as will be described hereafter.

FIG. 2 is a front view drawing illustrating one embodiment of a polymer film 115. In one embodiment, the substrate element 105 and the aversive agent 110 are formed into the polymer film 115. The polymer film 115 may be cast, extruded, rolled, deposited, skived, laminated, coextruded, and/or coated.

FIG. 3 is a front view drawing illustrating one embodiment of a detergent package 120. The package 120 may contain a dangerous substance such as detergent, corrosive agents, and the like. In one embodiment, the polymer film 115 is laminated to the package 120. Alternatively, the polymer film 115 may be formed into the package 120.

Thus if the package 120 contacts saliva such as when a child chews on the package 120, the chemical coupling of the aversive agent 110 to the substrate element 105 is rapidly released. The taste, emetic reaction, odor, and/or pungency of the aversive agent 110 are immediately unpleasant to the child, stopping the child from continuing to chew on the package 120.

In addition, the polymer film 115 may be embodied in the package 120 such that the aversive agent 110 does not reduce the cleaning effectiveness of the detergent and is not introduced into the cleaning process. The aversive agent 110 may be chemically coupled to the substrate element 105 such that the aversive agent 110 is not released during ordinary handling, and not detached as a residue that may stain hands and/or clothing.

FIG. 4 is a schematic drawing illustrating one embodiment of Denatonium 205. The formula for Denatonium is $C_{28}H_{34}N_2O_3$. Denatonium 205 is a bitterant. Denatonium 205 may be in the form of Denatonium benzoate, described hereafter, and Denatoium saccharide. Denatoium saccharide has a bitterness threshold of 0.01 ppm.

Figure 5:
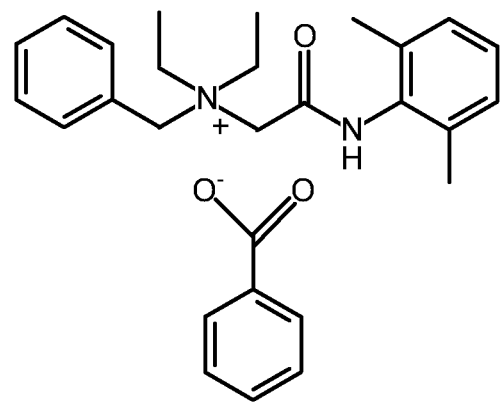
FIG. 5 is a schematic drawing illustrating one embodiment of Denatonium benzoate.

FIG. 5 is a schematic drawing illustrating one embodiment of Denatonium benzoate 210. Denatonium benzoate 210 combines Denatonium 205 with Benzoic acid $C_7H_6O_2$. Denatonium benzoate 210 has a bitterness threshold of 0.05 ppm.

Figure 6:
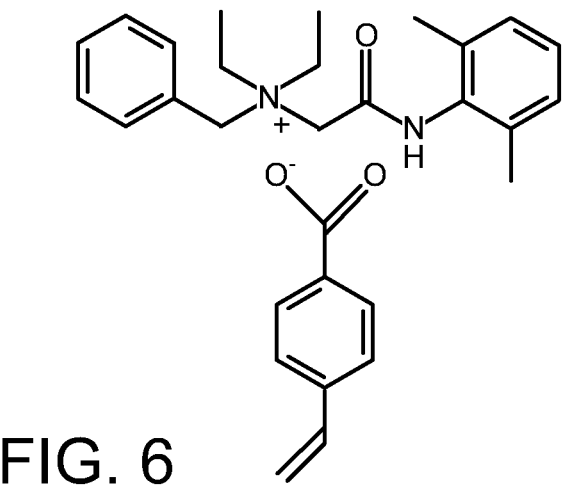
FIG. 6 is a schematic drawing illustrating one embodiment of Denatonium 4-vinylbenzoate.

FIG. 6 is a schematic drawing illustrating one embodiment of Denatonium 4-vinylbenzoate 215. Denatonium 4-vinylbenzoate 215 combines Denatonium 205 with Vinyl benzoic acid $C_9H_8O_2$.

Figure 7:
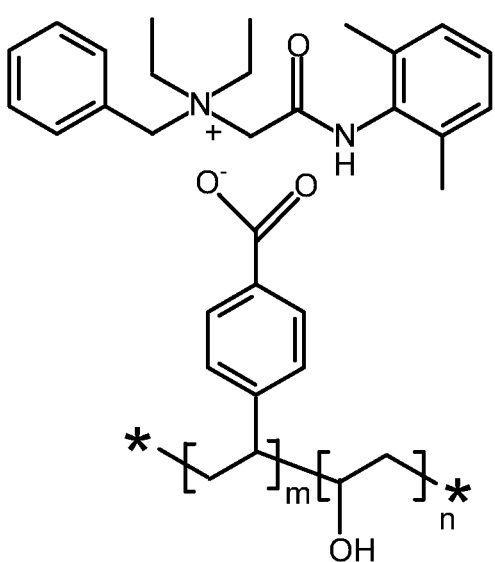
FIG. 7 is a schematic drawing illustrating one embodiment of polymerized Denatonium.

FIG. 7 is a schematic drawing illustrating one embodiment of polymerized Denatonium 220. The polymerized Denatonium 220 may be formed by polymerizing Denatonium 4-vinylbenzoate 215. In one embodiment, the Denatonium 4-vinylbenzoate 215 is polymerized with vinyl acetate $C_4H_6O_2$. Alternatively, the 4-vinylbenzoate 215 may be polymerized with vinyl acetate, followed by hydrolysis and metathesis with a denatonium salt.

Figure 8:
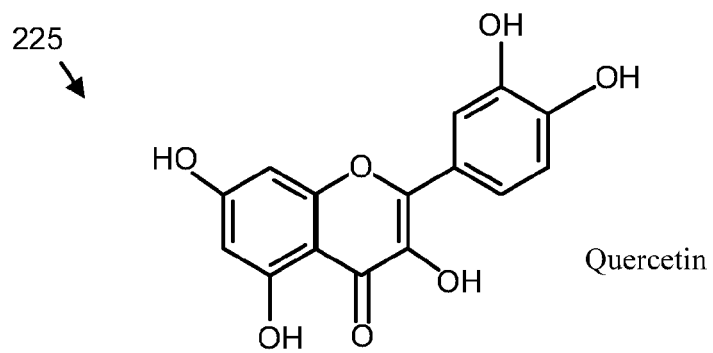
FIG. 8 is a schematic drawing illustrating one embodiment of Quercetin.

FIG. 8 is a schematic drawing illustrating one embodiment of Quercetin 225. Quercetin 225 has a composition of $C_{15}H_{10}O_7$. One of skill in the art will recognize that other bitter phenolics may be used as bitterants.

Figure 9:
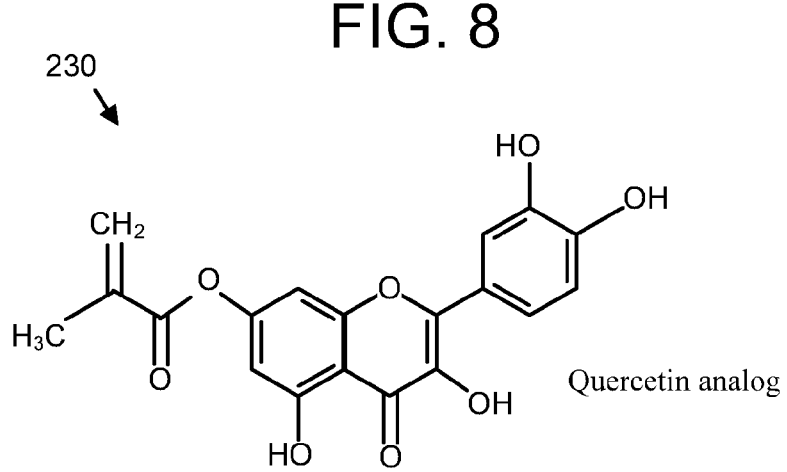
FIG. 9 is a schematic drawing illustrating one embodiment of a Quercetin analog.

FIG. 9 is a schematic drawing illustrating one embodiment of a Quercetin analog 230. In the depicted embodiment, the Quercetin analog 230 is Quercetin methacrylate. It is known in the art that phenolic esters are substantially labile to alkaline conditions such as those existing in the mouth.

Figure 10:
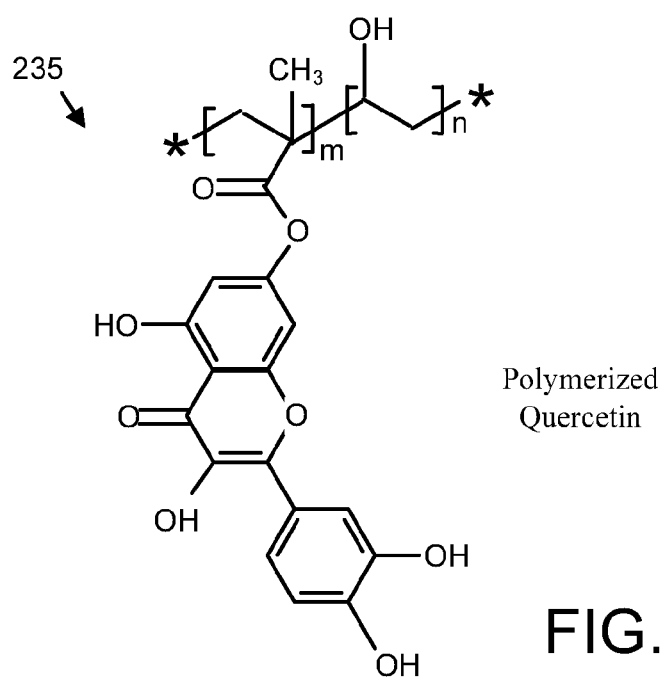
FIG. 10 is a schematic drawing illustrating one embodiment of polymerized Quercetin.

FIG. 10 is a schematic drawing illustrating one embodiment of polymerized Quercetin 235. In one embodiment, a Quercetin analog 230 such as Quercetin methacrylate is co-polymerized with a carboxylic acid such as methacrylic acid to form the polymerized Quercetin 235

Figure 11:
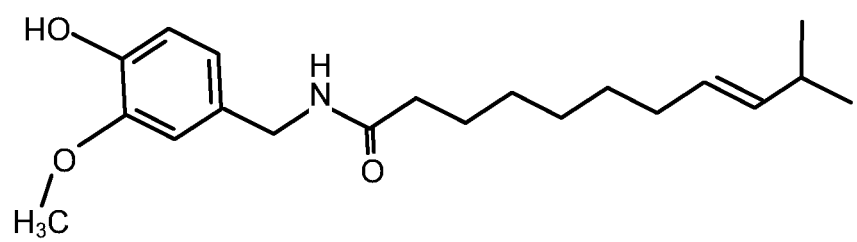
FIG. 11 is a schematic drawing illustrating one embodiment of Capsaicin.

FIG. 11 is a schematic drawing illustrating one embodiment of Capsaicin 245. The Capsaicin has a formula of $C_{18}H_{27}NO_3$. The Capsaicin 245 may have a pungency of 16,000,000 Scoville heat units.

Figure 12:
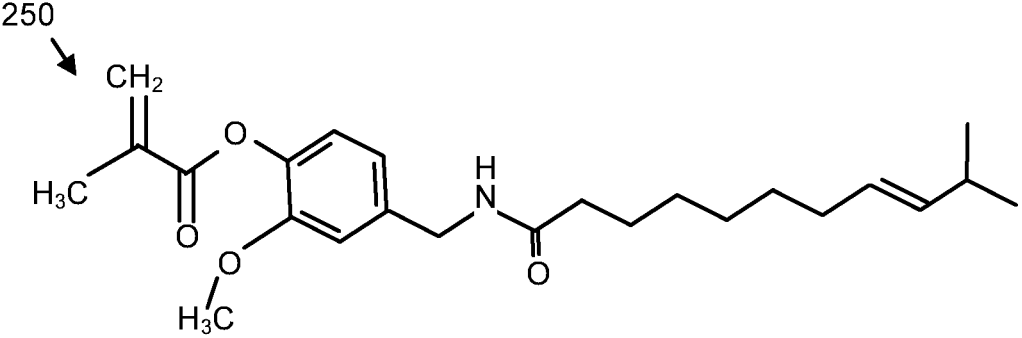
FIG. 12 is a schematic drawing illustrating one embodiment of a Capsaicin analog.

FIG. 12 is a schematic drawing illustrating one embodiment of a Capsaicin analog 250. In the depicted embodiment, the Capsaicin analog 250 is Capsaicin methacrylate. Alternatively, the Capsaicin analog 250 may be Dihydrocapsaicin, Nordihydrocapsaicin, Homodihydrocapsaicin, Homocapsaicin, and Nonivamide.

Figure 13:
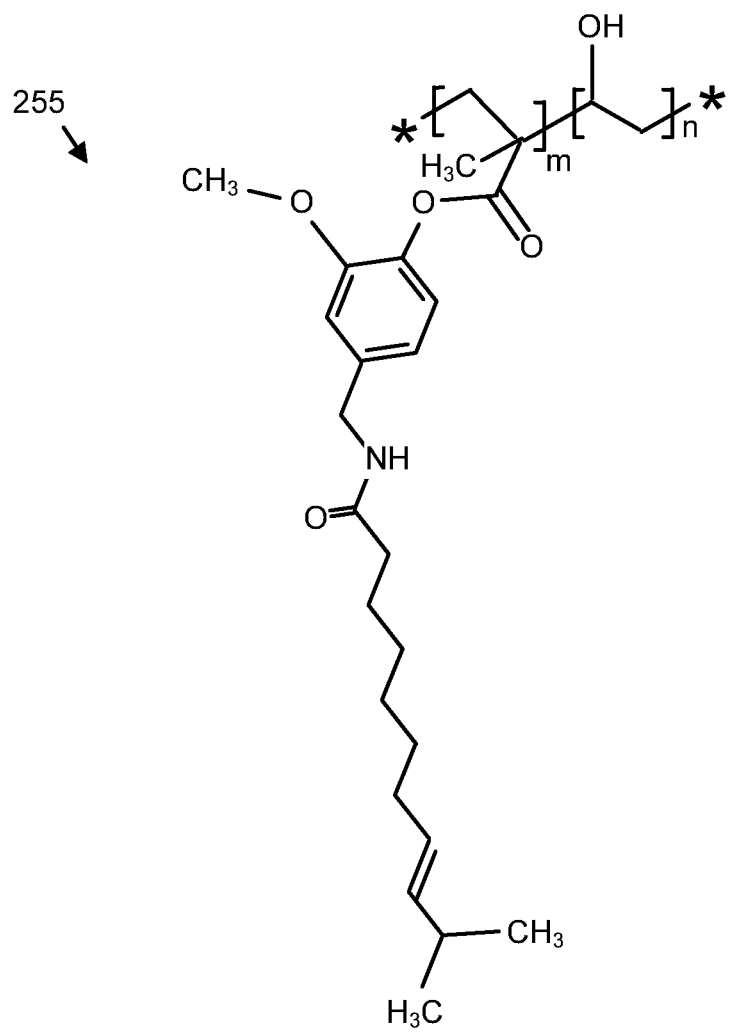
FIG. 13 is a schematic drawing illustrating one embodiment of polymerized Capsaicin.

FIG. 13 is a schematic drawing illustrating one embodiment of polymerized Capsaicin 255. In one embodiment, a Capsaicin analog 250 may be polymerized with a carboxylic acid such as methacrylic acid to form the polymerized Capsaicin 255.

Figure 14:
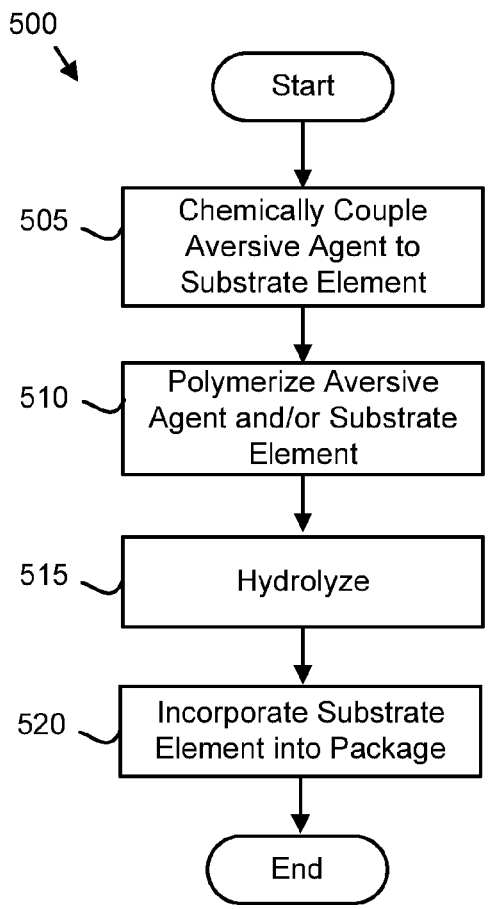
FIG. 14 is a schematic flow chart diagram illustrating one embodiment of a polymer composition formation method.

FIG. 14 is a schematic flow chart diagram illustrating one embodiment of a polymer composition formation method 500. The method 500 starts and in one embodiment, the aversive agent 110 is chemically coupled 505 to the substrate element 105. In one embodiment, the aversive agent 110 is covalently coupled to the substrate element 105. Alternatively, the aversive agent 110 may be coupled with an ionic bond to the substrate element 105.

In one embodiment, the aversive agent 110 is chemically coupled 505 to the substrate element 105 through monomer stoichiometry. The aversive agent 110 may react with the polymer film substrate element 105. Alternatively, the aversive agent 110 may react with the polymerizable moiety.

In one embodiment, the aversive agent 110 may be chemically coupled 505 to the substrate element 105 through an ion exchange metathesis reaction. The ion exchange metathesis reaction may employ vinylbenzoic acid to bond the aversive agent 110 to the substrate element 105.

In one embodiment, a polymerizable moiety substrate element 105 with chemically bonded aversive agent 110 is polymerized 510. The polymerizable moiety substrate element 105 may be polymerized 510 with radical polymerization. Alternatively, the polymerizable moiety substrate element 105 may be polymerized 510 with condensation polymerization.

In one embodiment, the aversive agent 110 is polymerized 510. In a certain embodiment, an aversive agent 110 such as Denatonium 4-vinylbenzoic acid 215 is polymerized 510 with the vinyl acetate.

Alternatively, the aversive agent 110 may be chemically coupled 505 to the polymer film substrate element 105, so that the polymerization 510 is performed before the chemical coupling of the aversive agent 110 to the substrate element 105.

In one embodiment, the aversive agent 110 is chemically coupled to the substrate element 105 which has been hydrolyzed 515. The degree of hydrolysis may be between 85 percent and 100 percent.

The substrate element 105 chemically coupled to the aversive agent 110 may be incorporated into a package 120 and the method 500 ends. In one embodiment, the substrate element 105 chemically coupled to the aversive agent 110 is formed into a polymer film 115. The polymer film 115 may be laminated to the package 120. Alternatively, the polymer film 115 may be formed into the package 120.

Figure 15:
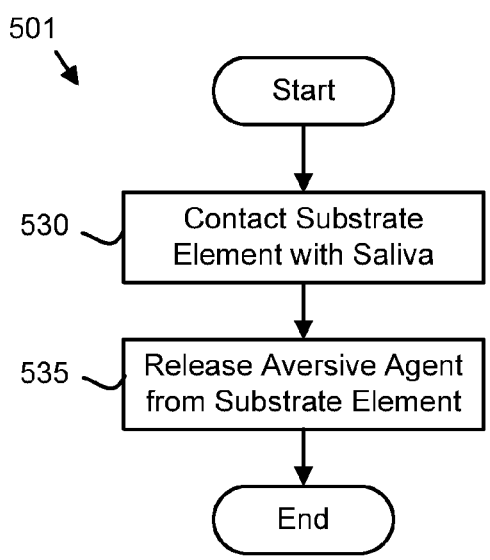
FIG. 15 is a schematic flow chart diagram illustrating one embodiment of an aversive agent release method.

FIG. 15 is a schematic flow chart diagram illustrating one embodiment of an aversive agent release method 501. The method 501 releases the aversive agent 110 from the substrate element 105. The method 501 starts, and in one embodiment the substrate element 105 with aversive agent 110 contacts 530 saliva. In one embodiment, the substrate element 105 and chemically coupled aversive agent 110 is incorporated in a package 120. The pH of saliva may be between 7.2 and 7.5.

In one embodiment, the substrate element 105 with aversive agent 110 contacts 530 saliva when a child places the package 120 incorporating the substrate element 105 with aversive agent 110 into the child's mouth. Because puncturing the package 120 can be extremely harmful to the child, the substrate element 105 must quickly persuade the child to remove the package 120 from the child's mouth.

The alkaline saliva breaks the chemical coupling between the substrate element 105 and the aversive agent 110, releasing 535 the aversive agent 110 from the substrate element 105 and the method 501 ends. In one embodiment, sufficient aversive agent 110 is released within 2 seconds to dissuade the child from chewing on the package 120. In a certain embodiment, sufficient aversive agent 110 is released within 500 ms to dissuade the child from chewing on the package 120. In one embodiment, a typical child is dissuaded from chewing on the package when a bitterness exceeds 10 ppm. Alternatively, a child may be dissuaded from chewing on the package 120 when tasting a pungent agent with a pungency in excess of 100,000 Scoville heat units.

By rapidly releasing the aversive agent 110 when the substrate element 105 contacts saliva, a package 120 comprising a substrate element 105 with aversive agent 110 becomes immediately distasteful to a child chewing on the package 120. As a result, the child does not chew on the package 120 long enough to puncture the package and release the contents. The child is therefore much less likely to puncture the package 120 and ingest, inhale, or otherwise contact the dangerous contents.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A polymer composition comprising:
a substrate element; and
a polymerizable aversive agent chemically coupled to the substrate element, the chemical coupling labile to saliva.

2. The polymer composition of claim 1, wherein the aversive agent is selected from the group consisting of bitterants, emetics, and pungent agents.

3. The polymer composition of claim 2, wherein the bitterant is selected from the group consisting of a denatonium salt and a quercetin analog.

4. The polymer composition of claim 3, wherein the denatonium salt is denatonium 4-vinylbenzoate.

5. The polymer composition of claim 3, wherein the bitterant has a bitterness threshold in the range of 20 to 0.01 parts per million (ppm).

6. The polymer composition of claim 2, wherein the pungent agent is a capsaicin analog.

7. The polymer composition of claim 1, wherein the substrate element is a polymer binder selected from the group consisting of polyvinyl alcohols, polyvinyl alcohol copolymers, hydroxypropyl methyl cellulose (HPMC), polyacrylic and polymethacrylic acids, vinylbenzoic acid, and copolymers thereof.

8. The polymer composition of claim 7, wherein the aversive agent is copolymerized with the polymer binder.

9. The polymer composition of claim 1, wherein the substrate element is a polymerizable moiety.

10. The polymer composition of claim 9, wherein the polymerizable moiety is polymerized by one of radical polymerization and condensation polymerization.

11. The polymer composition of claim 1, wherein the aversive agent is chemically coupled to the substrate element through monomer stoichiometry, polymerization, and hydrolysis.

12. The polymer composition of claim 1, wherein the aversive agent is chemically coupled to the substrate element through polymerization, hydrolysis, and an ion exchange metathesis reaction.

13. The polymer composition of claim 12, wherein the ion exchange metathesis reaction employs vinylbenzoic acid.

14. The polymer composition of claim 13, wherein the aversive agent is polymerized with vinyl acetate.

15. The polymer composition of claim 1, wherein the aversive agent is released within 500 millisecond of the substrate contact with the saliva.

16. The polymer composition of claim 1, wherein the substrate element and aversive agent is formed into a polymer film.

17. The polymer composition of claim 16, wherein the polymer film is laminated to a package.

18. The polymer composition of claim 17, wherein the polymer film is formed into a package.

19. A method comprising:
chemically coupling a polymerizable aversive agent to a substrate element,
wherein the chemical coupling is labile to saliva; and
incorporating the aversive agent and substrate element into a package.

20. A package comprising:
a polymerized substrate element incorporated on the package;
a polymerizable aversive agent chemically coupled to the substrate element, the chemical coupling labile to saliva; and
a surfactant enclosed within the package.

* * * * *